United States Patent [19]
Yuki et al.

[11] Patent Number: 5,675,350
[45] Date of Patent: Oct. 7, 1997

[54] SIGNAL CONVERSION APPARATUS AND DISPLAY APPARATUS USING THE SAME

[75] Inventors: Osamu Yuki, Atsugi; Yasuhiro Ito, Sagamihara, both of Japan

[73] Assignee: Canon Kabushiki Kaisha, Tokyo, Japan

[21] Appl. No.: 593,267

[22] Filed: Jan. 29, 1996

Related U.S. Application Data

[63] Continuation of Ser. No. 169,039, Dec. 20, 1993, abandoned.

[30] Foreign Application Priority Data

Dec. 21, 1992 [JP] Japan .................. 4-355458

[51] Int. Cl.⁶ .................................................. G09G 3/36
[52] U.S. Cl. .................................................. 345/58
[58] Field of Search ................... 345/58, 87, 93, 345/100, 156; 348/790, 205, 607

[56] References Cited

U.S. PATENT DOCUMENTS

| | | | |
|---|---|---|---|
| 3,938,136 | 2/1976 | Kawakami | 345/58 |
| 4,130,779 | 12/1978 | Miller et al. | 345/58 |
| 4,367,924 | 1/1983 | Clark et al. | 350/334 |
| 4,373,157 | 2/1983 | Holz et al. | 345/58 |
| 4,613,854 | 9/1986 | Holz et al. | 345/58 |
| 4,945,352 | 7/1990 | Ejiri | 345/58 |

FOREIGN PATENT DOCUMENTS

| | | | |
|---|---|---|---|
| 56-107216 | 8/1981 | Japan . | |
| 3-274019 | 12/1991 | Japan | 345/58 |

OTHER PUBLICATIONS

"Crosstalk–Free Driving Methods for STN–LCDS" Kaneko et al; Fujitsui Labs Ltd; SID vol. XXI; 1990.

*Primary Examiner*—Victor R. Kostak
*Attorney, Agent, or Firm*—Fitzpatrick, Cella, Harper & Scinto

[57] ABSTRACT

A signal conversion apparatus allows long distance transmission while suppressing cross talk between adjacent signal lines and the introduction of external noise, even when signals are transmitted at a high rate. The signal conversion apparatus is interposed between an image signal source for outputting in image signal and a display apparatus for displaying an image in accordance with the image signal and includes a first conversion unit for converting an unbalanced signal supplied from the image signal source to a balanced signal, and a second conversion unit for converting the balanced signal outputted by the first conversion unit and outputting it to the display apparatus.

7 Claims, 5 Drawing Sheets

[INPUT CHARACTERISTICS]

[OUTPUT CHARACTERISTICS]

SIGNAL CONVERSION APPARATUS AND DISPLAY APPARATUS USING THE SAME

This application is a continuation of application Ser. No. 08/169,039 filed Dec. 20, 1993, now abandoned.

BACKGROUND OF THE INVENTION

1. Field of the Invention

The present invention relates to a signal conversion apparatus and more particularly to a signal conversion apparatus suitable to use in a display apparatus using a ferroelectric liquid crystal.

2. Related Background Art

A cathode ray tube (CRT) has been used as a display apparatus for a personal computer and a workstation. Recently, however, a liquid crystal display apparatus having a TN (twisted nematic) or STN (super twisted nematic) structure has been used in a lap-top personal computer in view of advantages of light weight and thinness due to its structure. Under such a circumstance, a liquid crystal display apparatus having a ferroelectric property proposed by Clark and Lagerwall in Japanese Laid-Open Patent Application No. 56-107216 and U.S. Pat. No. 4,364,924 has been attracting notice as a high resolution and large screen size liquid crystal display apparatus having a memory property.

As the resolution and screen size of the liquid crystal display apparatus increase, frequencies of an image signal and a transfer clock for the image signal tend to rise. In the prior art, the frequency of the image signal is suppressed low because a plurality of bits of the image signal are read from an image memory of a display control unit. In transmitting the signal, an unbalanced signal is used in many cases because of an advantage of low cost.

However, since the frequency of the image signal rises as the screen size and the resolution of the liquid crystal display apparatus increases, the prior art method of collectively reading the plurality of bits from the image memory of the display control unit has reached a limit due to a restriction of the number in wires of a transmission line.

SUMMARY OF THE INVENTION

It is a primary object of the present invention to allow a long distance transmission by restricting cross talk between adjacent signal lines and/or introduction of a noise signal even when a signal is transmitted at a high speed.

In the prior art signal conversion apparatus requires an input device and an output device because it should be arranged adjacent to the input device and the output device. When a plurality of display apparatuses are used for display, separate signal convertion apparatuses are required adjacent to the respective display apparatuses. It is a second object of the present invention to allow the signal conversion in such a case by a conversion apparatus of the same configuration.

In order to achieve the above objects, in accordance with the present invention, a signal conversion apparatus interposed between an image signal source for outputting an image signal and a display apparatus for displaying an image in accordance with the image signal comprises a first conversion unit for converting an unbalanced signal supplied from the image signal source to a balanced signal, and a second conversion unit for converting the balanced signal outputted by the first conversion unit and outputting it to a display apparatus.

Preferably, each of the first and second conversion units includes a non-conversion terminal for inputting and outputting a signal not to be converted, a conversion terminal for inputting and outputting a signal to be converted, signal conversion means for not effecting the conversion for the signal inputted and outputted through the non-conversion terminal and effecting the conversion between the unbalanced signal and the balanced signal for the signal inputted and outputted through the conversion terminal, and means for selecting a direction of input and output of the signal inputted and outputted to the signal conversion means. Each of the first and second conversion units preferably has means for rendering the output circuit thereof to a high resistance state. Usually, the first and second units are of the same construction.

The display apparatus may be a liquid crystal display apparatus which may have a ferroelectric property.

A plurality of display apparatus and second conversion units may be provided for one image signal source.

BRIEF DESCRIPTION OF THE DRAWINGS

FIG. 3, consisting of FIGS. 3A–3D, show a timing chart of rapidly changing unbalanced display signals of display apparatus 11–13 in the system of FIG. 2, FIG. 4, consisting of FIGS. 4A–4D, shows a timing chart of unbalanced display signals in a continued static state of the display apparatus 11–13 in the system of FIG. 2, and FIGS. 5A, consisting of FIGS. 5A-1 through 5A-3 and 5B, consisting of FIGS. 5B-1 through 5B-3, show signals inputted and outputted to a balanced signal input and output connector of the apparatus of FIG. 1.

DETAILED DESCRIPTION OF THE PREFERRED EMBODIMENTS

Figure 1:
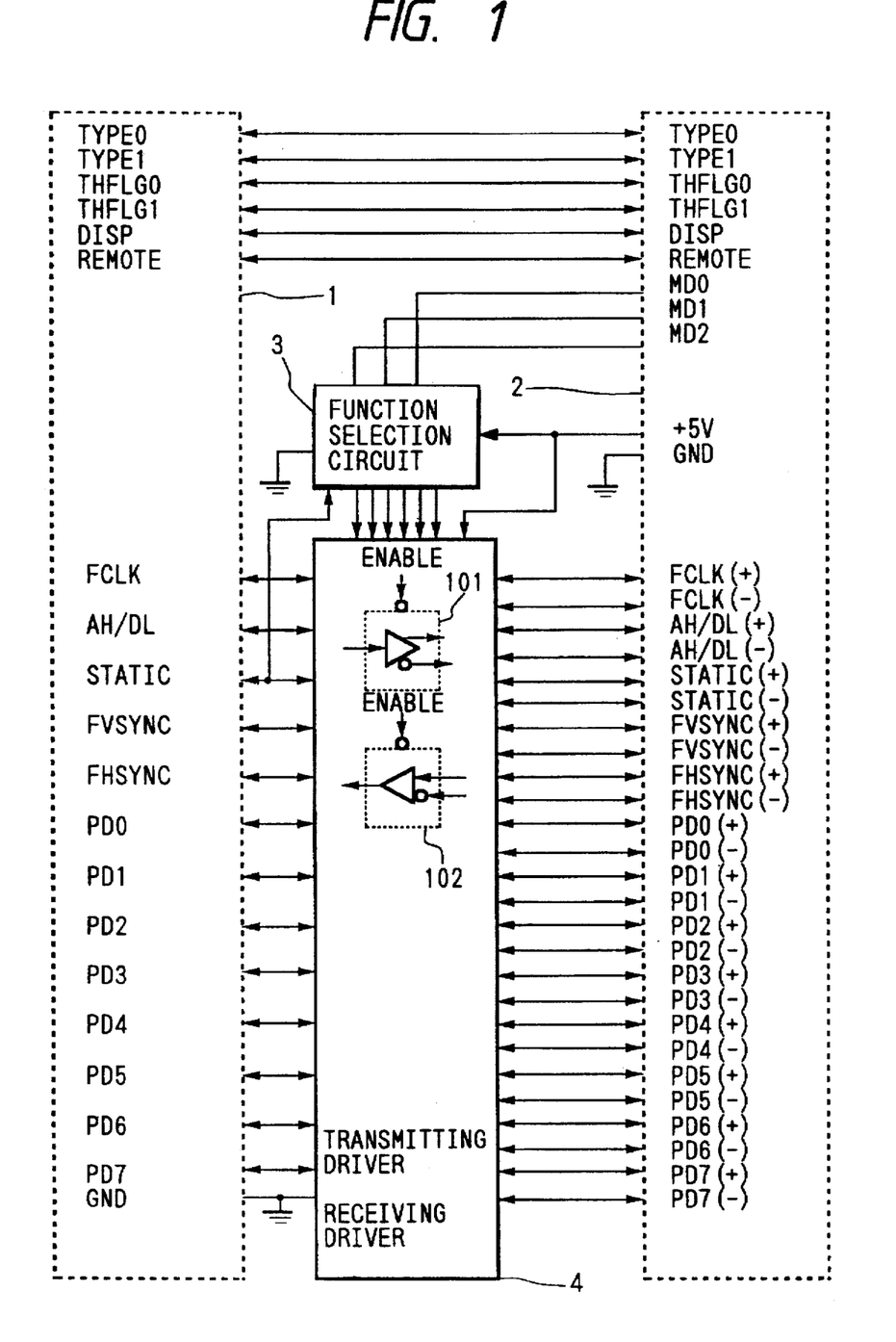
FIG. 1 shows a circuit diagram of a signal conversion apparatus in accordance with one embodiment of the present invention.

FIG. 1 shows a circuit diagram of a signal conversion apparatus in accordance with one embodiment of the present invention. The apparatus comprises an unbalanced signal input and output connector 1 and a balanced signal input and output connector 2 which have non-conversion terminals TYPE0 etc. for inputting and outputting signals TYPE0 etc. not to be converted and conversion terminals FCLK, FCLK (+), FCLK(−), etc. for inputting and outputting signals FCLK, FCLK(+), FCLK(−), etc. to be converted, a signal conversion driver circuit 4 for effecting the conversion between the unbalanced signal and the balanced signal for the signals inputted and outputted through the conversion terminals, and a function selection circuit 3 for selecting a direction of input and output of the signals to be inputted and outputted to the signal conversion driver circuit 4.

Level signals shown in Table 1 are inputted and outputted to the unbalanced signal input and output connector 1. For the static signals (TYPE0, TYPE1, THFLG0, THFLG1, DISP and REMOTE) which are not to be converted, they are straightly-connected by a printed circuit board. Input signals MD0–MD2 including the static signals have the property shown in Table 1.

TABLE 1

| Common Characteristics | Voltage Range of Operating Power Supply | 4.5–5.5 V |
|---|---|---|
| | Static Consumed Current | 80 µA (5.5 V) |
| Input Characteristics | Input Voltage | Low level +0.8 V |
| | | High level +2.0 V |
| | Input Current | Low Level −1.0 µA |
| | | High level +1.0 µA |
| | Input Capacitance | 4.5 pF (5.5 V) |
| | DC Margin | 0.7/2.4 V |

Figure 5A:
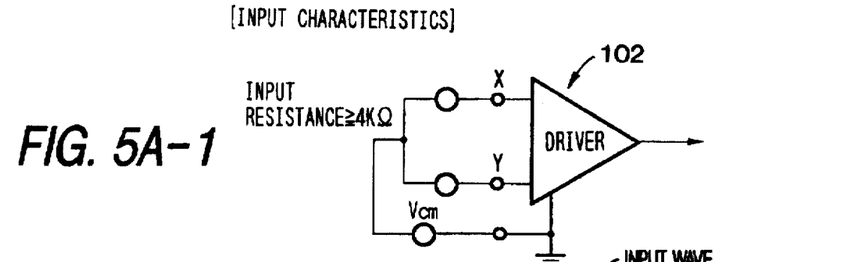
Figures 5A, 5A:
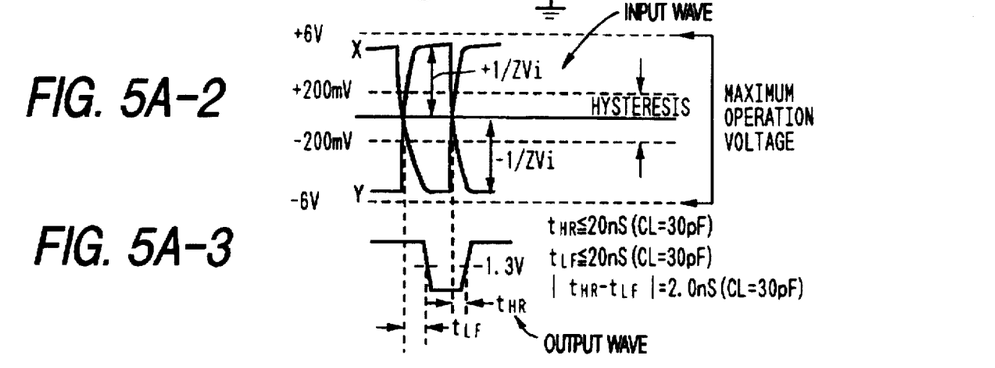
Figure 5B:
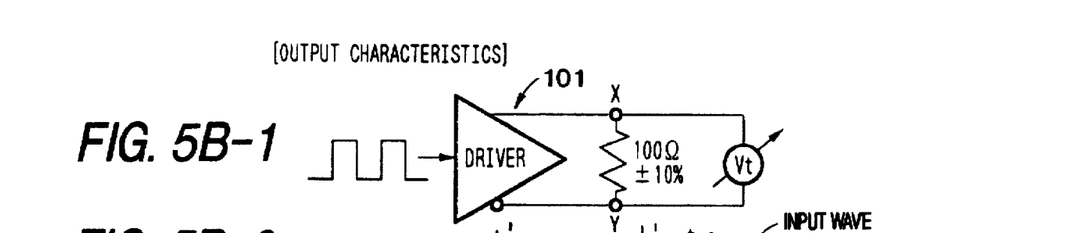
Figures 5B, 5B:
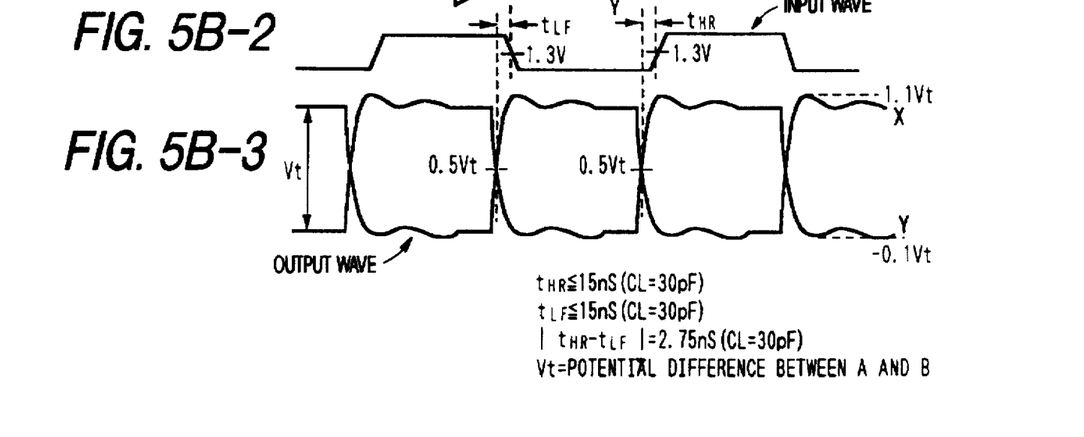

Signals a and b having levels shown in FIGS. 5A and 5B are inputted and outputted to the balanced signal input and output connector 2.

The signal conversion driver circuit 4 converts the unbalanced signal inputted from the connector 1 to a balanced signal and outputs it to the connector 2, and converts the balanced signal inputted from the connector 2 to an unbalanced signal and outputs it to the connector 1.

The function selection circuit 3 selects the converted signal and the conversion signal and sets the output of the conversion signal to a high impedance state. The function selection circuit 3 is constructed by a programmable logic IC which selects status of predetermined signal lines to be connected to the connectors. In operating the apparatus, the IC is programmed in accordance with the intended use. By this function, the signal conversion in the input device and the output device can be effected by the conversion apparatus of the same configuration.

Figure 2:
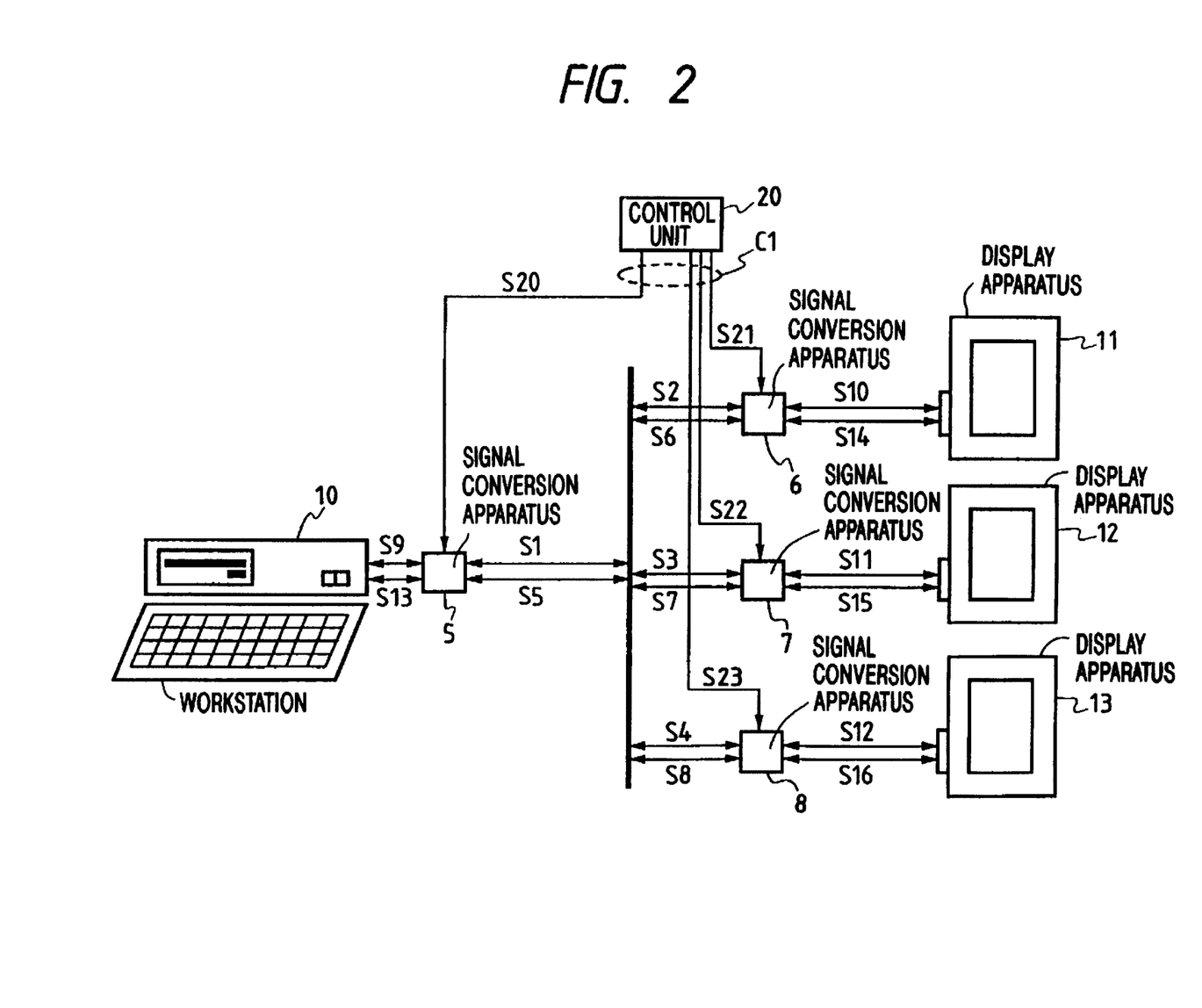
FIG. 2 shows a block diagram of a display system having a plurality of display apparatus to which the apparatus of FIG. 1 is applied.
Figure 3A:
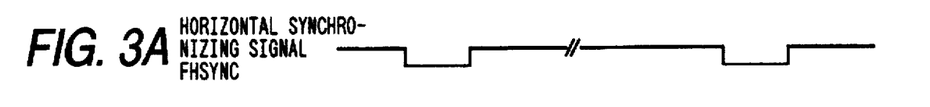
Figure 3B:
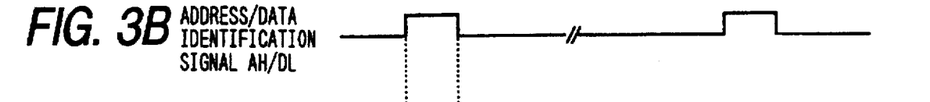
Figure 3C:
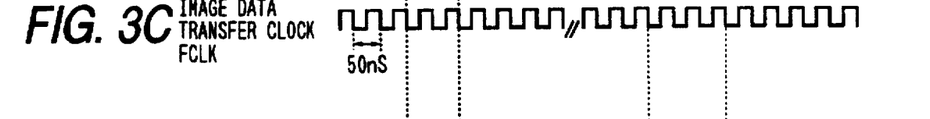
Figure 3D:
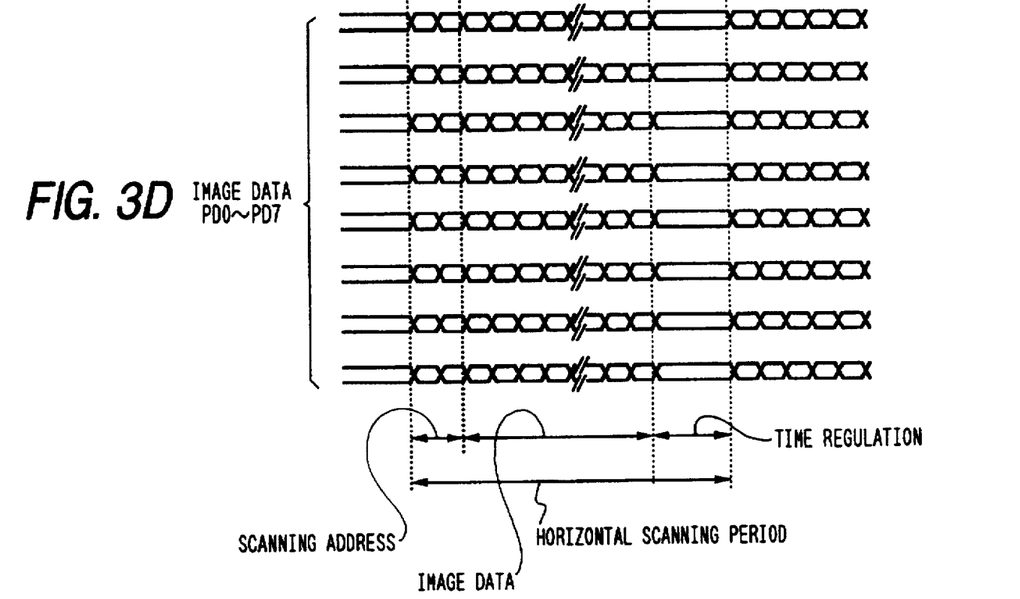
Figure 4A:
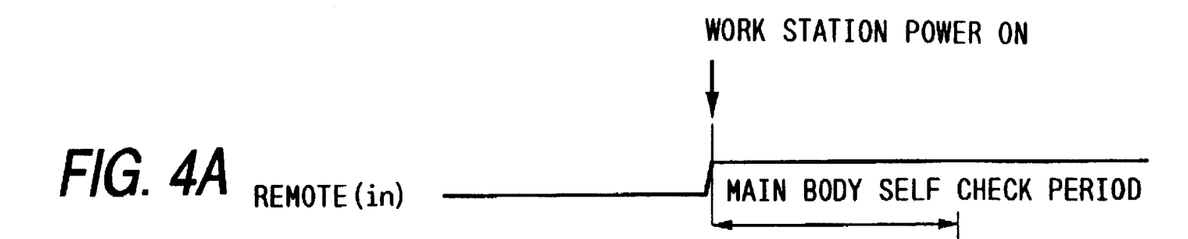
Figure 4B:
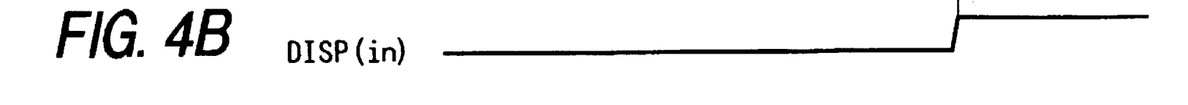
Figure 4C:
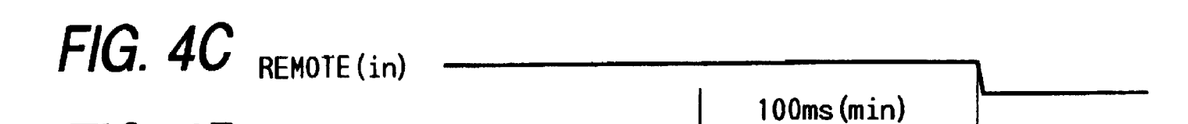
Figure 4D:
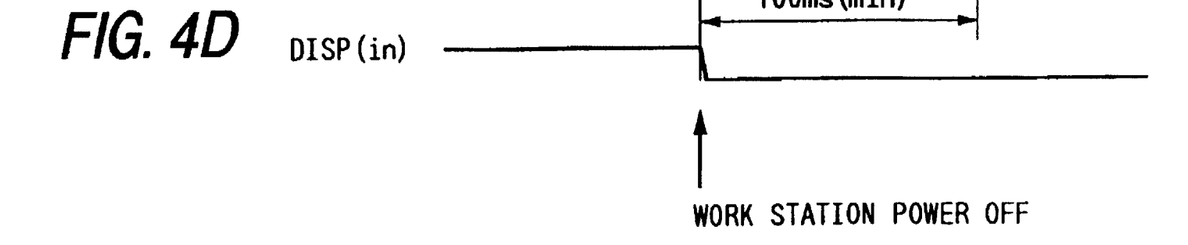

FIG. 4 shows a timing chart of signals REMOTE and DISP. As shown in FIG. 4, those signals change their levels only at the turn-on and turn-off of a power supply of a workstation (FIG. 2). Those signals having a small number of times of change of level per unit time such as TYPE0, TYPE1, THFLG0, DISP and REMOTE are handled as pass-through signals as described above.

FIG. 2 shows a block diagram of a display system to which the apparatus of FIG. 1 is applied. In FIG. 2, numerals 5–8 denote signal conversion apparatus shown in FIG. 1, which are each of the same configuration. Numeral 10 denotes a workstation having a display control unit, which generates a display signal. Numerals 11–13 denote display apparatus using ferroelectric liquid crystal for displaying by internal synchronization in accordance with the display signal, and numeral 20 denotes a control unit for selecting the function of the signal conversion apparatuses 5–8. The rapidly changing unbalanced signals shown in FIG. 3 are applied to the display apparatus 11–13. S1–S4 denote balanced signals transmitted and received between the signal conversion apparatus 5 and signal conversion apparatuses 6–8, S5–S8 denote unbalanced signals transmitted and received between the signal conversion apparatus 5 and the signal conversion apparatus 6–8, S9–S13 denote unbalanced signals transmitted and received between the signal conversion apparatus 5 and the workstation 10, and S10–S12 and S14–S16 denote unbalanced signals transmitted and received between the signal conversion apparatus 6–8 and the display apparatus 11–13. 20S–23S denote a set of three function selection lines (signals) for connecting the control unit 20 and the signal conversion apparatus 5–8.

The signal conversion apparatuses 5–8 are selected to a host state, a slave state, a master state and a non-selection state shown in Table 2 by the voltage levels LOW and HIGH of the signals MD0–MD2 sent from the control unit 20 through the function selection lines 20S–23S.

TABLE 2

| | Host State | Slave State | Master State | Mon-Selection State |
|---|---|---|---|---|
| MD0 | LOW | LOW | LOW | HIGH |
| MD1 | LOW | HIGH | HIGH | HIGH |
| MD2 | HIGH | LOW | HIGH | HIGH |

Namely, the signal conversion driver circuit 4 has a differential conversion unit as shown in FIGS. 5A and 5B which effects the conversion from the unbalanced signal to the balanced signal or from the balanced signal to the unbalanced signal, and in the differential conversion unit, the input and output direction of the signal is selected as shown by 101 and 102 in FIG. 1 by the signal voltage levels of the terminals MD0–MD2 of the balanced signal input and output connector 2, and the high impedance state is selected. Accordingly, the differential conversion units of the same configuration selectively convert in the selected direction and stops the output in accordance with the logical levels (LOW, HIGH) of the signals MD0–MD2. Thus, the apparatus assumes the states shown in Table 2.

The signal conversion apparatus 5 is selected to the host state, and the signal conversion apparatus 6–8 are selected to the master, slave or non-selection state. For example, when the signal conversion apparatus 5 is in the host state, the signal conversion apparatus 6 is in the master state and the signal conversion apparatus 7 and 8 are in the slave state, the display apparatus 11–13 are in the display state. When the signal conversion apparatus 5 is in the host state, the signal conversion apparatus 6 is in the master state and the signal conversion apparatus 7 and 8 are in the non-selection state, only the display apparatus 11 is in the display state. In this manner, even if the signal conversion apparatus 5–8 are of the same configuration, the display apparatus 11–13 can separately or simultaneously display by the selection of the functions.

Table 3 shows the input and output (IN/OUT) states of the signals and the contents thereof at the unbalanced signal input and output connector 1 in the host state. In the Table, OUT indicates the output of the unbalanced signal from the differential conversion unit corresponding to the signal, and IN indicates the input of the unbalanced signal to the differential conversion unit corresponding to the signal. The host state is used in combination with a source having the unbalanced signal input and output. Accordingly, the conversion from the unbalanced signal to the balanced signal is effected.

TABLE 3

| Signal | IN/OUT | Content |
|---|---|---|
| PCLK | IN | Image data transmission clock |
| AH/DL | IN | Address/image data identification signal |
| REMOTE | IN | FLCD logic unit power on/off control signal |
| DISP | IN | Display on/off control signal |
| STATIC | IN | FLCD image display freeze signal |
| FHSYNC | OUT | Image data request signal |
| FVSYNC | OUT | Sync signal by frame |
| TYPE0 | OUT | Panel type identification signal |
| TYPE1 | OUT | |
| THFLG0 | OUT | Temperature flag |
| THFLG1 | OUT | |
| PD0 | IN, OUT | Scan address/image data (PD0 |
| PD1 | IN, OUT | left side as viewed toward panel) |

TABLE 3-continued

| Signal | IN/OUT | Content |
|---|---|---|
| PD2 | IN, OUT | |
| PD3 | IN, OUT | |
| PD4 | IN, OUT | |
| PD5 | IN, OUT | |
| PD6 | IN, OUT | |
| PD7 | IN, OUT | |
| FG | — | Frame ground |
| GND | — | Ground |

Tables 4 and 5 show the input and output states (IN/OUT) and the contents of the signals at the balanced signal input and output connector 2 in the host state. In the Tables, OUT indicates the output of the unbalanced signal from the differential conversion unit corresponding to the signal, and IN indicates the input of the unbalanced signal to the differential conversion unit corresponding to the signal.

TABLE 4

| Signal | IN/OUT | Content |
|---|---|---|
| VCC | IN | +5 V power supply |
| VCC | IN | +5 V power supply |
| PD7 (+) | IN, OUT | Scan address/image data differential signal (+) |
| PD6 (−) | IN, OUT | Scan address/image data differential signal (−) |
| PD5 (+) | IN, OUT | Scan address/image data differential signal (+) |
| PD4 (−) | IN, OUT | Scan address/image data differential signal (−) |
| PD3 (+) | IN, OUT | Scan address/image data differential signal (+) |
| PD2 (−) | IN, OUT | Scan address/image data differential signal (−) |
| PD1 (+) | IN, OUT | Scan address/image data differential signal (+) |
| PD0 (−) | IN, OUT | Scan address/image data differential signal (−) |
| $\overline{\text{MD2}}$(ALL) | IN | Mode 2 signal: Pull up to Vcc |
| GND | — | Ground |
| TYPE1 | IN | Panel type identification signal |
| GND | — | Ground |
| TYPE0 | IN | Panel type identification signal |
| FHSYNC (−) | IN | Image data request differential signal (−) |
| FVSYNC (+) | IN | Sync differential signal (+) frame |
| $\overline{\text{STATIC}}$(−) | OUT | FLCD image display freeze differential signal (−) |
| REMOTE | OUT | FLCD logic unit power on/off signal |
| GND | — | Ground |
| AH/DL (+) | OUT | Address/image data identification differential signal (+) |
| $\overline{\text{MD1}}$(IF) | IN | Mode 1 signal: connect to ground |
| FCLK (+) | OUT | Image data transmission clock differential signal (+) |
| $\overline{\text{MD0}}$(CS) | IN | Mode 0 signal (+) |
| GND | — | Ground |

TABLE 5

| Signal | IN/OUT | Content |
|---|---|---|
| VCC | IN | +5 V power supply |
| VCC | IN | +5 V power supply |
| PD7 (−) | IN, OUT | Scan address/image data differential signal (−) |
| PD6 (+) | IN, OUT | Scan address/image data differential signal (+) |
| PD5 (−) | IN, OUT | Scan address/image data differential signal (−) |
| PD4 (+) | IN, OUT | Scan address/image data differential signal (+) |
| PD3 (−) | IN, OUT | Scan address/image data differential signal (−) |
| PD2 (+) | IN, OUT | Scan address/image data differential signal (+) |
| PD1 (−) | IN, OUT | Scan address/image data differential signal (−) |
| PD0 (+) | IN, OUT | Scan address/image data differential signal (+) |
| GND | — | Ground |
| THFLG1 | IN | Temperature flag |
| GND | — | Ground |
| THFLG0 | IN | Temperature flag |
| GND | — | Ground |
| FHSYNC (+) | IN | Image data request differential signal (+) |
| FVSYNC (−) | IN | Sync differential signal (−) by frame |
| STATIC(+) | OUT | FLCD image display freeze differential signal (+) |
| GND | — | Ground |
| DISP | OUT | Display on/off signal |
| AH/DL (−) | OUT | Address/image data identification differential signal (−) |
| GND | — | Ground |
| FCLK (−) | OUT | Image data transmission clock differential signal (−) |
| GND | — | Ground |
| GND | — | Ground |

Table 6 shows input and output states (IN/OUT) and contents of the signals at the unbalanced signal input and output connector 1 in the slave state.

TABLE 6

| Pin No. | Signal | IN/OUT | Content |
|---|---|---|---|
| 3 | FCLK | OUT | Image data transmission clock |
| 5 | AH/DL | OUT | Address/image data identification signal |
| 7 | REMOTE | OUT | FLCD unit power on/off control signal |
| 31 | DISP | OUT | Display on/off control signal |
| 33 | STATIC | OUT | FLCD image display freeze signal |
| 35 | FHSYNC | IN | Image data request signal |
| 9 | FVSYNC | IN | Sync signal by frame |
| 11 | TYPE0 | IN | Panel type identification signal |
| 13 | TYPE1 | IN | |
| 37 | THFLG0 | IN | Temperature flag |
| 39 | THFLG1 | IN | |
| 41 | PD0 | OUT | Scan address/image data (PD0 left side as viewed toward panel) |
| 17 | PD1 | OUT | |
| 43 | PD2 | OUT | |
| 19 | PD3 | OUT | |
| 45 | PD4 | OUT | |
| 21 | PD5 | OUT | |
| 47 | PD6 | OUT | |
| 23 | PD7 | OUT | |
| 1 | FG | — | Frame ground |
| See below | GND | — | Ground |

Tables 7 and 8 show input and output states (IN/OUT) and contents of the signals at the balanced signal input and output connector 2 in the slave state.

TABLE 7

| Signal | IN/OUT | Content |
|---|---|---|
| VCC | IN | +5 V power supply |
| VCC | IN | +5 V power supply |
| PD7 (+) | IN | Scan address/image data differential signal (+) |
| PD6 (−) | IN | Scan address/image data differential signal (−) |
| PD5 (+) | IN | Scan address/image data differential signal (+) |
| PD4 (−) | IN | Scan address/image data differential signal (−) |
| PD3 (+) | IN | Scan address/image data differential signal (+) |
| PD2 (−) | IN | Scan address/image data differential signal (−) |
| PD1 (+) | IN | Scan address/image data differential signal (+) |
| PD0 (−) | IN | Scan address/image data differential signal (−) |
| $\overline{MD2(ALL)}$ | IN | Mode 2 signal: Connect to ground |
| GND | — | Ground |
| TYPE1 | OUT | Panel type identification signal |
| GND | — | Ground |
| TYPE0 | OUT | Panel type identification signal |
| FHSYNC (−) | — | High impedance: Image data request, differential signal (−) |
| FVSYNC (+) | — | High impedance: Sync differential signal (+) by frame |
| $\overline{STATIC}$(−) | IN | FLCD image display freeze differential signal (−) |
| REMOTE | IN | FLCD logic unit power on/off signal |
| GND | — | Ground |
| AH/DL (+) | IN | Address/image data identification differential signal (+) |
| $\overline{MD1(IF)}$ | IN | Mode 1 signal: Pull up to Vcc |
| FCLK (+) | IN | Image data transmission clock differential signal (+) |
| $\overline{MD0(CS)}$ | IN | Mode 0 signal: Connect to ground |
| GND | — | Ground |

TABLE 8

| Signal | IN/OUT | Content |
|---|---|---|
| VCC | IN | +5 V power supply |
| VCC | IN | +5 V power supply |
| PD7 (−) | IN | Scan address/image data differential signal (−) |
| PD6 (+) | IN | Scan address/image data differential signal (+) |
| PD5 (−) | IN | Scan address/image data differential signal (−) |
| PD4 (+) | IN | Scan address/image data differential signal (+) |
| PD3 (−) | IN | Scan address/image data differential signal (−) |
| PD2 (+) | IN | Scan address/image data differential signal (+) |
| PD1 (−) | IN | Scan address/image data differential signal (−) |
| PD0 (+) | IN | Scan address/image data differential signal (+) |
| GND | — | Ground |
| THFLG1 | OUT | Temperature flag |
| GND | — | Ground |
| THFLG0 | OUT | Temperature flag |
| GND | — | Ground |
| FHSYNC (+) | — | High impedance: Image data request differential signal (+) |
| FVSYNC (−) | — | High impedance: Sync differential signal (−) by frame |
| $\overline{STATIC}$(+) | IN | FLCD image display freeze differential signal (+) |
| GND | — | Ground |
| DISP | IN | Display on/off signal |

TABLE 8-continued

| Signal | IN/OUT | Content |
|---|---|---|
| AH/DL (−) | IN | Address/image data identification differential signal (−) |
| GND | — | Ground |
| FCLK (−) | IN | Image data transmission clock differential signal (−) |
| GND | — | Ground |
| GND | — | Ground |

Table 9 shows input and output states (IN/OUT) and contents of the signals at the unbalanced signal input and output connector 1 in the master state.

TABLE 9

| Signal | IN/OUT | Content |
|---|---|---|
| FCLK | OUT | Image data transmission clock |
| AH/DL | OUT | Address/image data identification signal |
| REMOTE | OUT | FLCD logic unit power on/off control signal |
| DISP | OUT | Display on/off control signal |
| $\overline{STATIC}$ | OUT | FLCD image display freeze signal |
| FHSYNC | IN | Image data request signal |
| FVSYNC | IN | Sync signal by frame |
| TYPE0 | IN | Panel type identification signal |
| TYPE1 | IN |  |
| THFLG0 | IN | Temperature flag |
| THFLG1 | IN |  |
| PD0 | IN, OUT | Scan address/image data (PD0 on left side as viewed toward panel) |
| PD1 | IN, OUT |  |
| PD2 | IN, OUT |  |
| PD3 | IN, OUT |  |
| PD4 | IN, OUT |  |
| PD5 | IN, OUT |  |
| PD6 | IN, OUT |  |
| PD7 | IN, OUT |  |
| FG | — | Frame Ground |
| GND | — | Ground |

Tables 10 and 11 show input and output states (IN/OUT) of the signals at the balanced signal input and output connector 2 in the slave state.

TABLE 10

| Signal | IN/OUT | Content |
|---|---|---|
| VCC | IN | +5 V power supply |
| VCC | IN | +5 V power supply |
| PD7 (+) | IN, OUT | Scan address/image data differential signal (+) |
| PD6 (−) | IN, OUT | Scan address/image data differential signal (−) |
| PD5 (+) | IN, OUT | Scan address/image data differential signal (+) |
| PD4 (−) | IN, OUT | Scan address/image data differential signal (−) |
| PD3 (+) | IN, OUT | Scan address/image data differential signal (+) |
| PD2 (−) | IN, OUT | Scan address/image data differential signal (−) |
| PD1 (+) | IN, OUT | Scan address/image data differential signal (+) |
| PD0 (−) | OUT | Scan address/image data differential signal (−) |
| $\overline{MD2(ALL)}$ | IN | Mode 2 signal: Pull up to Vcc |
| GND | — | Ground |
| TYPE1 | OUT | Panel type identification signal |
| GND | — | Ground |
| TYPE0 | OUT | Panel type identification signal |
| FHSYNC (−) | OUT | Image data request differential |

TABLE 10-continued

| Signal | IN/OUT | Content |
|---|---|---|
| | | signal (−) |
| FVSYNC (+) | OUT | Sync differential signal (+) by frame |
| STATIC(−) | IN | FLCD image display freeze differential signal (−) |
| REMOTE | IN | FLCD logic unit power on/off signal |
| GND | — | Ground |
| AH/DL (+) | IN | Address/image data identification differential signal (+) |
| MD1(1F) | IN | Mode 1 signal: Pull up to Vcc |
| FCLK (+) | IN | Image data transmission clock differential signal (+) |
| MD0(CS) | IN | Mode 0 signal: Connect to ground |
| GND | — | Ground |

TABLE 11

| Signal | IN/OUT | Content |
|---|---|---|
| VCC | IN | +5 V power supply |
| VCC | IN | +5 V power supply |
| PD7 (−) | IN, OUT | Scan address/image data differential signal (−) |
| PD6 (+) | IN, OUT | Scan address/image data differential signal (+) |
| PD5 (−) | IN, OUT | Scan address/image data differential signal (−) |
| PD4 (+) | IN, OUT | Scan address/image data differential signal (+) |
| PD3 (−) | IN, OUT | Scan address/image data differential signal (−) |
| PD2 (+) | IN, OUT | Scan address/image data differential signal (+) |
| PD1 (−) | IN, OUT | Scan address/image data differential signal (−) |
| PD0 (+) | IN, OUT | Scan address/image data differential signal (+) |
| GND | — | Ground |
| THFLG1 | OUT | Temperature flag |
| GND | — | Ground |
| THFLG0 | OUT | Temperature flag |
| GND | — | Ground |
| FHSYNC (+) | OUT | Image data request differential signal (+) |
| FVSYNC (−) | OUT | Sync differential signal (−) by frame |
| STATIC(+) | IN | FLCD image display freeze differential signal (+) |
| GND | — | Ground |
| DISP | IN | Display on/off signal |
| AH/DL (−) | IN | Address/image data identification differential signal (−) |
| GND | — | Ground |
| FCLK (−) | IN | Image data transmission clock differential signal (−) |
| GND | — | Ground |
| GND | — | Ground |

Table 12 shows input and output states (IN/OUT) and contents of the signals at the unbalanced signal input and output connector 1 in the non-selection state.

TABLE 12

| Signal | IN/OUT | Content |
|---|---|---|
| FCLK | OUT | Image data transmission clock |
| AH/DL | OUT | Address/image data identification signal |
| REMOTE | OUT | FLCD logic unit power on/off control signal |
| DISP | OUT | Display on/off control signal |

TABLE 12-continued

| Signal | IN/OUT | Content |
|---|---|---|
| STATIC | OUT | FLCD image display freeze signal |
| FHSYNC | IN | Image data request signal |
| FVSYNC | IN | Sync signal by frame |
| TYPE0 | IN | Panel type identification signal |
| TYPE1 | IN | |
| THFLG0 | IN | Temperature flag |
| THFLG1 | IN | |
| PD0 | OUT | Scan address/image data (PD0 on left side as viewed toward panel) |
| PD1 | OUT | |
| PD2 | OUT | |
| PD3 | OUT | |
| PD4 | OUT | |
| PD5 | OUT | |
| PD6 | OUT | |
| PD7 | OUT | |
| FG | — | Frame ground |
| GND | — | Ground |

Tables 13 and 14 show input and output states (IN/OUT) and contents of the signals at the unbalanced signal input and output connector 2 in the non-selection state.

TABLE 13

| Signal | IN/OUT | Content |
|---|---|---|
| VCC | IN | +5 V power supply |
| VCC | IN | +5 V power supply |
| PD7 (+) | IN | Scan address/image data differential signal (+) |
| PD6 (−) | IN | Scan address/image data differential signal (−) |
| PD5 (+) | IN | Scan address/image data differential signal (+) |
| PD4 (−) | IN | Scan address/image data differential signal (−) |
| PD3 (+) | IN | Scan address/image data differential signal (+) |
| PD2 (−) | IN | Scan address/image data differential signal (−) |
| PD1 (+) | IN | Scan address/image data differential signal (+) |
| PD0 (−) | IN | Scan address/image data differential signal (−) |
| MD2(ALL) | IN | Mode 2 signal: Pull up to Vcc |
| GND | — | Ground |
| TYPE1 | OUT | Panel type identification signal |
| GND | — | Ground |
| TYPE0 | OUT | Panel type identification signal |
| FHSYNC (−) | — | High impedance: Image data request differential signal (−) |
| FVSYNC (+) | — | High impedance: Sync differential signal (+) by frame |
| STATIC(−) | IN | FLCD image display freeze differential signal (−) |
| REMOTE | IN | FLCD logic unit power on/off signal |
| GND | — | Ground |
| AH/DL (+) | IN | Address/image data identification differential signal (+) |
| MD1(1F) | IN | Mode 1 signal: Pull up to Vcc |
| FCLK (+) | IN | Image data transmission clock differential signal (+) |
| MD0(CS) | IN | Mode 0 signal: Pull up to Vcc |
| GND | — | Ground |

TABLE 14

| Signal | IN/OUT | Content |
|---|---|---|
| VCC | IN | +5 V power supply |
| VCC | IN | +5 V power supply |
| PD7 (−) | IN | Scan address/image data |

TABLE 14-continued

| Signal | IN/OUT | Content |
| --- | --- | --- |
| | | differential signal (−) |
| PD6 (+) | IN | Scan address/image data differential signal (+) |
| PD5 (−) | IN | Scan address/image data differential signal (−) |
| PD4 (+) | IN | Scan address/image data differential signal (+) |
| PD3 (−) | IN | Scan address/image data differential signal (−) |
| PD2 (+) | IN | Scan address/image data differential signal (+) |
| PD1 (−) | IN | Scan address/image data differential signal (−) |
| PD0 (+) | IN | Scan address/image data differential signal (+) |
| GND | — | Ground |
| THFLG1 | OUT | Temperature flag |
| GND | — | Ground |
| THFLG0 | OUT | Temperature flag |
| GND | — | Ground |
| FHSYNC (+) | — | High impedance: Image data request differential signal |
| FVSYNC (−) | — | High impedance: Sync differential signal (−) by frame |
| STATIC(+) | IN | FLCD image display freeze differential signal (+) |
| GND | — | Ground |
| DISP | IN | Display on/off signal |
| AH/DL (−) | IN | Address/image data identification differential signal (−) |
| GND | — | Ground |
| FCLK (−) | IN | Image data transmission clock differential signal (−) |
| GND | — | Ground |
| GND | — | Ground |

While the display on a plurality of display apparatus has been shown in the present embodiment, the present signal conversion apparatus is also applicable to other display system by programming the function selection circuit.

In accordance with the present invention, the first object is attained by the conversion from the unbalanced signal to the balanced signal. Namely, the balanced signal is converted by the first conversion unit and it is transmitted to the second conversion unit so that even if the signal is transmitted at a high rate, cross talk between the adjacent signal lines and the introduction of external noise are reduced and long distance transmission is attained without difficulty. Further, since the balanced signal has a small signal level, high speed transmission is attained and the number of wires of the transmission line may be small.

The second object of realizing the various functions by the apparatus of the same configuration is attained by the means for selecting the input and output direction of the signals inputted and outputted to the signal conversion apparatus, and the means for rendering the output to the high resistance state. By switching the direction of the signal to be converted and the conversion signal and programming the apparatus such that the output of the conversion signal assumes the high impedance state, the states of the signal lines at the terminals are selected to the desired states. Accordingly, the same configuration may be used as the signal conversion apparatus for the image signal source and the display apparatus. The apparatus may also be used when a plurality of display apparatus are used for display from one signal source.

Since the display signal of the liquid crystal display apparatus includes a control signal which is not high speed, the inadvertent conversion to the balanced signal leads to the increase of cost of the display system. The signal as shown in FIG. 3 which changes many times per unit time and has a high frequency is readily subject to an external noise. Thus, the conversion from the unbalanced signal to the balanced signal or the reverse conversion is effected through the conversion terminal. For the signal as shown in FIG. 4 which has a small number of times of change per unit time and has a low frequency, it is passed through the conversion terminal because it is less subject to the external noise. In this manner, the increase of cost is suppressed.

In accordance with the present invention, the image signal can be transmitted at a high speed over a long distance. Thus, the display system which uses the present conversion apparatus has many applications such as the display in a traffic system, the demonstration and the reliability test. The cost of the display system is suppressed low because the conversion apparatus of the same configuration may be used for various applications. The present invention attains the signal conversion of the high speed and complex display system at a low cost.

What is claimed is:

1. A signal conversion apparatus to be interposed between an image signal source for outputting an image signal having a logical level and a display apparatus for displaying an image in accordance with the image signal, said apparatus comprising:

a first conversion unit for converting an unbalanced signal having a logical level input from the image signal source to a balanced signal having a logical level and outputting the balanced signal; and a second conversion unit for converting the balanced signal output by said first conversion unit to an unbalanced signal having a logical level and outputting the same to the display apparatus.

2. A signal conversion apparatus according to claim 1 wherein each of said first and second conversion units includes a non-conversion terminal for inputting and outputting a signal not to be converted, a conversion terminal for inputting and outputting a signal to be converted, signal conversion means for not effecting the conversion for the signal input and output through said non-conversion terminal and effecting the conversion between the unbalanced signal having the logical level and the balanced signal having the logical level for the signal input and output through said conversion terminal, and means for selecting directions of input and output of the signals input and output to said signal conversion means.

3. A signal conversion apparatus according to claim 2, wherein each of said first and second conversion units includes means for rendering the output thereof to a high resistance state.

4. A signal conversion apparatus according to claim 2, wherein said first and second conversion units are of identical configuration.

5. A signal conversion apparatus according to any of claims 1 to 4, wherein said display apparatus is a liquid crystal display apparatus.

6. A signal conversion apparatus according to any of claims 1 to 4, wherein said image signal source is one in number and said display apparatus and said second conversion unit are plural in number.

7. A signal conversion apparatus according to any of claims 1 to 4, wherein said display apparatus is a liquid crystal display apparatus having a ferroelectric property.

* * * * *

UNITED STATES PATENT AND TRADEMARK OFFICE
CERTIFICATE OF CORRECTION

PATENT NO. : 5,675,350

DATED : October 7, 1997

INVENTOR(S): OSAMU YUKI ET AL.

It is certified that error appears in the above-identified patent and that said Letters Patent is hereby corrected as shown below:

[57] ABSTRACT

Line 6, "in" should read --an--.

COLUMN 1

Line 51, "convertion" should read --conversion--.

COLUMN 2

Line 65, "straightly-" should read --straightly--.

COLUMN 4

Line 3, "Mon-" should read --Non---.

COLUMN 5

Line 45, "(+)" should read --(+) by--.
   Line 53, "(+)" should read --(+) connect to ground--.

COLUMN 6

Line 53, "(PDO" should read --(PDO on--.

COLUMN 7

Line 64, "diaplay" should read --display--.

UNITED STATES PATENT AND TRADEMARK OFFICE
CERTIFICATE OF CORRECTION

PATENT NO. : 5,675,350

DATED : October 7, 1997

INVENTOR(S) : OSAMU YUKI ET AL.

It is certified that error appears in the above-identified patent and that said Letters Patent is hereby corrected as shown below:

<u>COLUMN 10</u>

Line 5, "diaplay" should read --display--.

<u>COLUMN 11</u>

Line 43, "cross talk" should read --cross-talk--.

Signed and Sealed this

Ninth Day of June, 1998

*Attest:*

BRUCE LEHMAN

*Attesting Officer*   *Commissioner of Patents and Trademarks*